Figure 3:
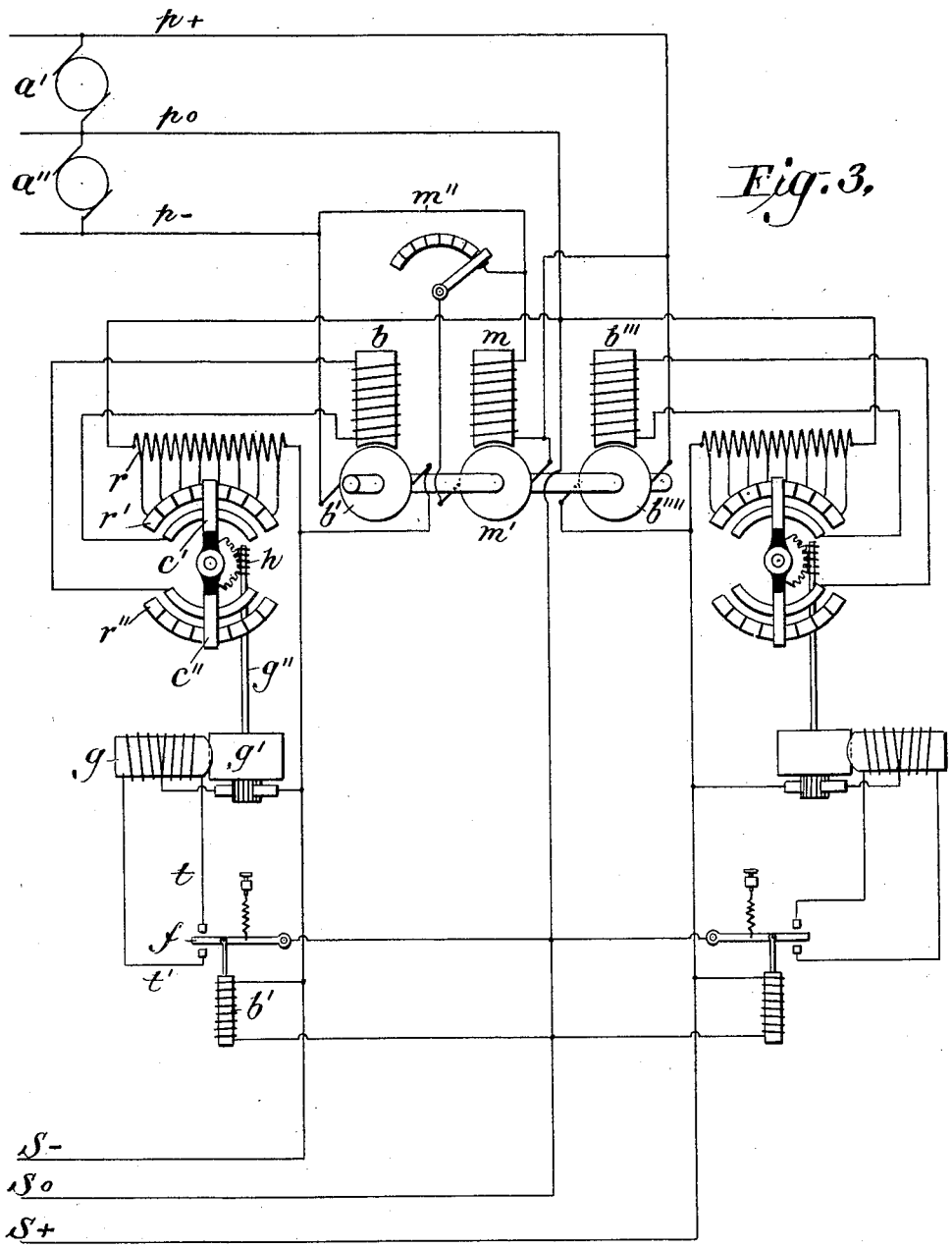

No. 671,489. Patented Apr. 9, 1901.
M. PFATISCHER & C. H. BEDELL.
BOOSTER CRUSHER.
(Application filed Aug. 24, 1900.)
(No Model.) 2 Sheets—Sheet 1.
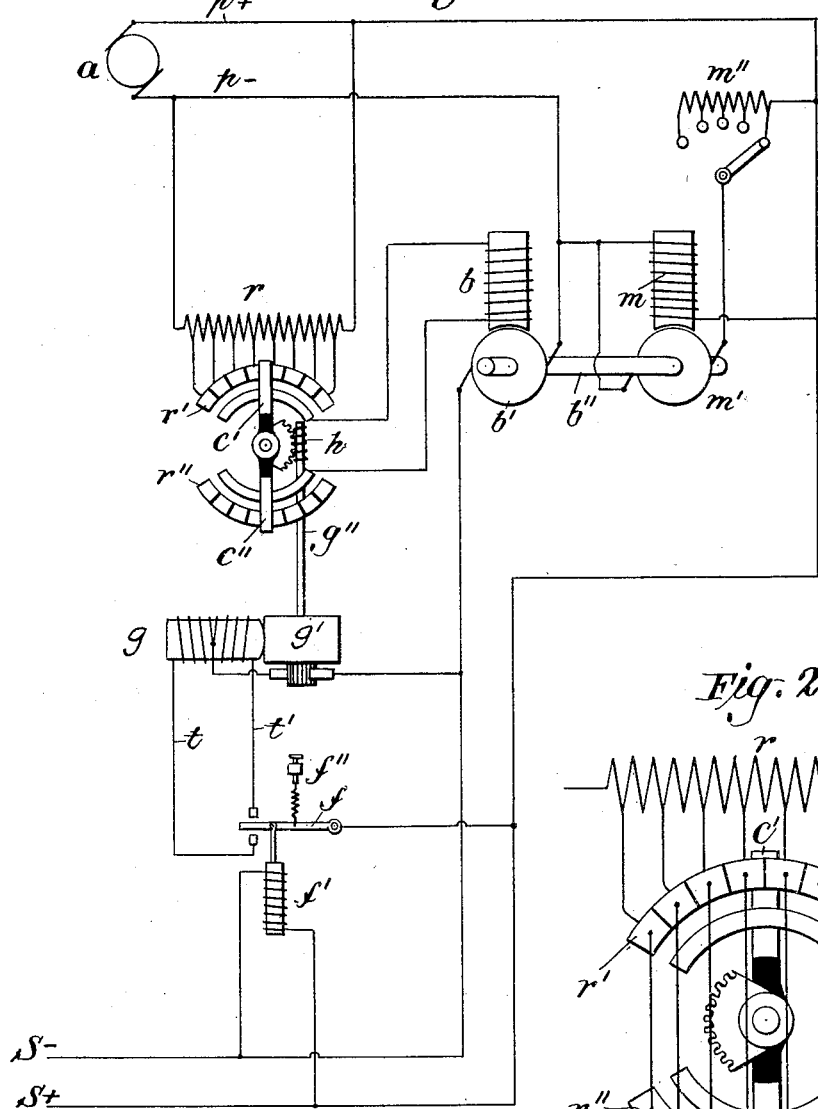
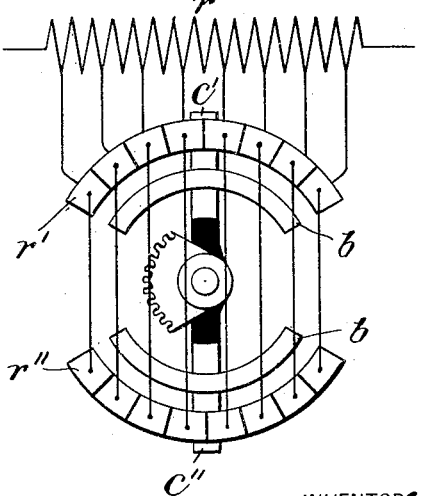
WITNESSES:
E. Van Zandt
H. E. Babcock.
INVENTORS
Mathias Pfatischer & Chas. H. Bedell
BY 
ATTORNEY No. 671,489. Patented Apr. 9, 1901.
M. PFATISCHER & C. H. BEDELL.
BOOSTER CRUSHER.
(Application filed Aug. 24, 1900.)
(No Model.) 2 Sheets—Sheet 2.

WITNESSES:
E. Van Zandt
H. E. Babcock

INVENTOR
Mathias Pfatischer & Chas. H. Bedell
BY Harold Pinney
ATTORNEY

UNITED STATES PATENT OFFICE.

MATHIAS PFATISCHER AND CHARLES H. BEDELL, OF PHILADELPHIA, PENNSYLVANIA, ASSIGNORS TO THE ELECTRO DYNAMIC COMPANY, OF SAME PLACE.

BOOSTER-CRUSHER.

SPECIFICATION forming part of Letters Patent No. 671,489, dated April 9, 1901.

Application filed August 24, 1900. Serial No. 27,946. (No model.)

*To all whom it may concern:*

Be it known that we, MATHIAS PFATISCHER and CHARLES H. BEDELL, of Philadelphia, Pennsylvania, (post-office address in care of the Electro Dynamic Company, of No. 224 Ionic street, Philadelphia, Pennsylvania,) have invented certain new and useful Improvements in Booster-Crushers or Devices for Maintaining a Constant Potential, of which the following is a specification, illustrated by drawings.

The invention is particularly applicable for the purpose of maintaining a constant or predetermined potential between the bus-bars or mains of a circuit supplied from generators or other sources of electrical power that are subject to some variation from the constant or desired amount. This object is accomplished by introducing an automatically-controlled device, which augments the electromotive force or potential when it tends to fall below the required amount as measured between any two points chosen—as, for example, the work-circuit or some one part of it—and, on the other hand, introduce a counter electromotive force when the electromotive force rises above the predetermined amount. A motor-generator (meaning an electrical machine that will act either as a motor or generator, as required) may be employed for this purpose. This motor-generator is termed a "booster-crusher," because it either boosts or crushes the potential, as may be required, to maintain it constant in the worked circuit or derived circuit. A source of mechanical power is provided for actuating the booster-crusher when it acts as a generator. This source of power may be a motor, though this is not necessarily the case. The field-magnet of the booster-crusher is controlled, preferably, by automatic switches and rheostats in a branch or derived circuit in such a manner that when the electromotive force is too low the field-magnet will be energized in a direction and to an amount necessary to augment the electromotive force, so as to maintain it at the proper amount. On the other hand, when the electromotive force tends to rise above the point desired the field-magnet of the booster-crusher is so energized as to cause the booster-crusher to absorb energy by introducing a counter electromotive force, and thereby to reduce the electromotive force in the circuit to the standard chosen. When, therefore, the potential is below the standard the booster-crusher acts as an auxiliary generator and maintains the desired standard potential in the portion of the circuit that is to be maintained constant. When the potential of the primary mains is above the standard, the booster-crusher is excited in the opposite direction to crush or reduce the potential and restore it to the standard.

The drawings illustrate two embodiments of the invention as applied to a two-wire and a three-wire system, respectively.

Figure 1 is a diagrammatic illustration of one embodiment of the invention as applied to a two-wire system. Fig. 2 is a detail view of the rheostat seen from beneath or from the opposite side of that shown in Fig. 1. Fig. 3 is a diagram of the invention as applied to a three-wire system.

Let $a$ represent the generator supplying the mains $p^+$ and $p^-$.

Let $s^+$ and $s^-$ represent the two mains or the bus-bars of the work portion of the circuit, having direct connections with the mains $p^+$ and $p^-$, but including in such direct connections the armature and commutator $b'$ of the booster-crusher, the field-magnet coil of which is indicated by $b$. The armature $b'$ is driven by the motor $m\ m'$. This is the preferable way of actuating the booster-crusher $b\ b'$. The armature $m'$ may be supplied from the main circuit through a rheostat $m''$, by which it may be controlled to increase or decrease the effect of the booster-crusher $b\ b'$. The coils of the field-magnet $m$ may be also supplied from the main circuit. The field-coils $b$ of the booster-crusher may be controlled and the current regulated and reversed by the double switch and the double set of contacts $r'\ r''$, which are connected together, as shown plainly in Fig. 2, and are connected at several points to the divided resistance or rheostat $r$. The two extreme ends of this divided resistance $r$ may be supplied from any constant or nearly constant source or electromotive force—as, for example, $p^+\ p^-$. The ends of the field-magnet coil $b$ terminate in arc-shaped contacts, over which the two arms $c'$ $c''$ of the switch sweep. When the switch-arm $c'$ is at the extreme right end of its movement and the switch-arm $c''$ is at the extreme left-hand end of its movement, the maximum current is supplied in one direction to the field-coil $b$. When the switch-arms $c'$ $c''$ are at the opposite end of their movement, the maximum current is supplied in the opposite direction. When the switch-arms are on the middle contacts, they are both connected to the same point in the divided resistance $r$, and no current goes through the field-coil $b$. Consequently by means of the switch-arms $c'$ $c''$ the strength and direction of the magnetic field of the booster-crusher $b$ $b'$ are governed, and it is caused to introduce either an augmenting or an opposing electromotive force into the circuit. This governing effect is accomplished automatically by actuating and controlling the switch-arms $c'$ $c''$ automatically from the circuit at $s^+$ $s^-$. One way of accomplishing this is shown in Fig. 1. A switch $f$ is controlled by a solenoid or electromagnet $f'$. A regulating-spring $f''$ acts against the solenoid $f'$ and is so set that the switch $f$ is in central or normal position when the desired standard potential exists between the mains or bus-bars of the desired circuit $s^+$ $s^-$. When the potential rises or falls from the standard, the switch $f$ makes contact with one or the other of terminals $t$ $t'$ of the electromotive device $g$ $g'$, which may consist of a field-magnet $g$ and an armature $g'$ and which is suitably connected, as by a shaft $g''$ and worm and worm-wheel $h$, to actuate the switch-arms $c'$ $c''$, that control the booster-crusher. The electromotive device $g'$ may derive power from any suitable source, provided that its connections are so arranged that it will run in one direction when the switch $f$ makes contact with the terminal $t$ and in the opposite direction when the switch $f$ makes contact with the terminal $t'$.

The operation of the system as shown is as follows: When the potential in the work-portion circuit is the standard potential desired, the switch $f$ will maintain its middle position and the electromotor $g$ $g'$ will be at rest. If now the potential rises slightly, the solenoid $f'$ will draw down the switch-arm $f$ to make contact with the terminal $t$ and so actuate the electromotor $g$ $g'$ in the direction which will cause it to move the switch-arms $c'$ $c''$ and energize the field-coils $b$ in the direction necessary to introduce counter electromotive force into the circuit by means of the armature $b'$. The movement of the switch-arms $c'$ $c''$ will continue until such counter electromotive force is sufficient to restore the potential to the standard. When the desired or standard potential is so restored, the switch-arm $f$ will break connection with the terminal $t$, and thereby bring the electromotor $g$ $g'$ and the switch-arms $c'$ $c''$ to rest. If the electromotive force supplied from the generator rises still further, the regulating adjustment just described will be repeated. When, on the other hand, the electromotive force falls below the desired standard in the work portion of the circuit the weakened force of the solenoid $f'$ will cause the switch $f$ to make contact with the terminal $t'$, and thereby actuate the electromotor $g$ $g'$ in a reverse direction and cause the switch-arms $c'$ $c''$ to be adjusted in the direction to introduce an augmenting electromotive force at the armature $b'$, (or to decrease the counter electromotive force if the booster-crusher is introducing a counter electromotive force.)

It must of course be understood that the drawings are strictly diagrammatic and that approved forms of automatic field-rheostats should be selected in carrying out the invention. The drawings, however, are intended to show that the work portion or any other chosen part of the circuit is made to govern the booster-crusher, so as to cause it to augment or diminish the electromotive force or potential in such portion of the circuit, and at this point it should be clearly understood that although we show the invention as adapted to be used for maintaining the potential as the standard condition desired in the secondary circuit the maintaining other conditions constant—such, for instance, as the constant current instead of the constant potential—may be obtained by connecting the solenoid $f'$ accordingly, the essential feature being that the conditions existing in the chosen part of the circuit are utilized to regulate the system and maintain constant any one condition that may be desired.

The application of the invention to three-wire circuits and other systems of electrical distribution will be obvious to those skilled in the art. In Fig. 3 one application of the invention to a three-wire circuit is shown, wherein two booster-crushers $b$ $b'$ and $b'''$ $b''''$ are driven from a single motor $m$ $m'$ and are introduced in the two mains $s^+$ and $s^-$, as will be clearly understood.

Having now set forth one preferred form of the invention and explained in what manner it may be used, without enumerating the many modifications that may be made by mere skill in the art and without departing from the principles of the invention, we claim the following as the essential and characteristic features:

1. In combination with a variable source of electrical energy, a circuit or branch circuit supplied therefrom, a motor-generator suitably actuated and included in circuit, and a field-magnet-controlling device for the said motor-generator governing the direction of the electromotive force produced by said motor-generator, and electromagnetic means supplied from said circuit for actuating the said controlling device, substantially as set forth.

2. In combination with a variable source of electrical energy, a circuit or branch circuit supplied therefrom, a motor-generator suitably actuated and included in circuit, and a field-magnet-controlling device for the said motor-generator governing both the direction and the amount of electromotive force produced by the said motor-generator, substantially as set forth.

3. In combination with a variable source of electrical energy, a circuit or branch circuit supplied therefrom, and means controlled by the electrical variation in said circuit for introducing an electromotive force either opposed to or acting with the electromotive force supplied directly from the main source, substantially as set forth.

Signed this 18th day of August, 1900, at Philadelphia, Pennsylvania.

MATHIAS PFATISCHER.
   CHARLES H. BEDELL.

Witnesses:
 A. P. RUTHERFORD,
 JAMES L. GOOD.